(12) United States Patent
Bernardon et al.

(10) Patent No.: US 9,728,986 B2
(45) Date of Patent: *Aug. 8, 2017

(54) INRUSH CURRENT LIMITING CIRCUIT

(71) Applicant: Infineon Technologies Austria AG, Villach (AT)

(72) Inventors: Derek Bernardon, Villach (AT); Hubert Rothleitner, Villach (AT)

(73) Assignee: INFINEON TECHNOLOGIES AUSTRIA AG, Villach (AT)

( * ) Notice: Subject to any disclaimer, the term of this patent is extended or adjusted under 35 U.S.C. 154(b) by 171 days.

This patent is subject to a terminal disclaimer.

(21) Appl. No.: 14/210,463

(22) Filed: Mar. 14, 2014

(65) Prior Publication Data
US 2014/0239919 A1    Aug. 28, 2014

Related U.S. Application Data

(63) Continuation of application No. 13/540,720, filed on Jul. 3, 2012, now Pat. No. 8,717,001.

(51) Int. Cl.
*H02M 3/156* (2006.01)
*H02J 7/00* (2006.01)
*H02M 1/36* (2007.01)
*H02M 3/158* (2006.01)
*H02H 9/00* (2006.01)
*H02H 9/02* (2006.01)

(52) U.S. Cl.
CPC ............ *H02J 7/0029* (2013.01); *H02M 1/36* (2013.01); *H02M 3/156* (2013.01); *H02H 9/001* (2013.01); *H02H 9/025* (2013.01); *H02M 3/158* (2013.01)

(58) Field of Classification Search
CPC . G05F 1/56; G05F 1/575; G05F 1/565; G05F 1/573; G05F 1/5735; H02M 3/156; H02M 3/1588; H02H 9/01
USPC .................. 323/222, 274–276, 282, 284, 908
See application file for complete search history.

(56) References Cited

U.S. PATENT DOCUMENTS 5,420,780 A  *  5/1995  Bernstein ............... H02H 9/001
                                                        323/908
6,307,360 B1 * 10/2001  Kajiwara ................ H02M 1/32
                                                        323/282

(Continued)

FOREIGN PATENT DOCUMENTS

CN          1294773 A      5/2001
CN        101048716 A     10/2007
(Continued)

*Primary Examiner* — Adolf Berhane
(74) *Attorney, Agent, or Firm* — Viering, Jentschura & Partner mbB

(57) ABSTRACT

In various embodiments a circuit is provided including: an input terminal to receive an input voltage; a switch, a first controlled input of which being coupled to the input terminal; an inductor, a first terminal of which may be coupled in series to a second controlled input of the switch; a freewheeling diode, wherein a first diode terminal may be coupled with the second controlled input of the switch and with the first terminal of the inductor, and wherein a second diode terminal may be coupled with a reference potential; a capacitor coupled with a second terminal of the inductor; and a controller configured to operate the switch and the inductor in continuous current mode to charge the capacitor.

20 Claims, 4 Drawing Sheets

(56) References Cited

U.S. PATENT DOCUMENTS

| | | | | |
|---|---|---|---|---|
| 6,841,979 B2* | 1/2005 | Berson | ............... | H02H 9/001 |
| | | | | 323/282 |
| 6,949,915 B2* | 9/2005 | Stanley | ............ | H02M 1/4208 |
| | | | | 323/207 |
| 7,215,106 B2* | 5/2007 | Sato | ............ | B41J 29/393 |
| | | | | 323/282 |
| 7,826,191 B1* | 11/2010 | Fisher | ............ | H02M 1/32 |
| | | | | 361/93.1 |
| 8,717,001 B2* | 5/2014 | Bernardon | ............ | H02M 1/36 |
| | | | | 323/284 |

FOREIGN PATENT DOCUMENTS

| | | |
|---|---|---|
| CN | 101834539 A | 9/2010 |
| CN | 202150695 U | 2/2012 |
| WO | 2004042793 A2 | 5/2004 |

\* cited by examiner

INRUSH CURRENT LIMITING CIRCUIT

CROSS-REFERENCE TO RELATED APPLICATIONS

This Continuation Patent Application claims priority to U.S. patent application Ser. No. 13/540,720, filed Jul. 3, 2012, which is incorporated herein by reference in its entirety.

TECHNICAL FIELD

Various embodiments relate to an inrush current limiting circuit.

BACKGROUND

Many electronic devices draw high instantaneous input currents when first switched on. Those currents are referred to as inrush currents and they not only complicate the design of, for example, overcurrent protection devices within the electronic device, but they may also cause actual damage to the electronic device as those inrush currents may exceed the normal steady state operating current of the electronic device by orders of magnitude.

One of the fields of electronics where high inrush currents may have to be dealt with are airbag systems. Airbag systems used nowadays mostly include an energy reserve capacitor which may be used to store charges for the case when for some reason, for example due to a crash, the electrical connection to the vehicle battery is lost. Therefore, the capacitance of the reserve capacitor is usually quite large, for example it may be a few tens of millifarad, for example 10 mF, in the exemplary case of a charge amounting to 330 millicoulomb which is stored at an operating voltage of 33V. With a reserve capacitor dimensioned properly, the airbag module may thus be provided with energy therefrom and be able to continue its proper operation. Thus the airbag may be deployed even when the connection to the battery is lost in case of an accident. However, the presence of the reserve capacitor with its big capacitance may be problematic with respect to the inrush current which may occur when the ignition of the car is enabled, triggering the start up of the airbag module. When the ignition key is inserted and turned as the car is to be started, a high inrush current may be drawn by the empty (i.e. discharged) reserve capacitor. Customers require an inrush current phase which is fast and controlled. However, serious problems have been reported in the past which are linked to inappropriate handling of the inrush current, even resulting in inadvertent deployment of the airbag when allowing the reserve capacitor to be charged in an uncontrolled manner.

With remotely controlled door locks entering the automotive market many car manufacturers choose to turn on the airbag module prior to the ignition key being inserted into the ignition, namely when the remote control button unlocking the car doors is pressed. This feature may require a so called "wake switch" which permits the airbag module to be initiated prior to turning on the car in the traditional way via its ignition switch. However, the "wake switch" in off-state may cause a very low quiescent current consumption when in sleep mode.

The two previously described requirements are typically provided separately from one another in airbag modules. The capacitor inrush current limiter may be provided in the form of an NFET (n-channel field effect transistor) with a current shunt resistor. The current flowing through the NFET is monitored via the shunt resistor and an overcurrent regulator may be used to control the gate of the NFET such that the NFET is driven into a more or less conducting state in correspondence to the current flowing therethrough. However, this solution requires an additional shunt resistor and an NFET gate driver including an overcurrent regulator. Both components are space consuming and costly. Instead of the separate additional shunt resistor, a special sense-NFET may be used which is provided with an internal current sensing functionality. Those approaches may have the further disadvantage that the NFET acting as a linear controller may get and therefore has to dissipate more power in the event of a high inrush current. Furthermore, as the current is limited, the main microcontroller of the airbag module may start its operation with a delay on the order of 100 milliseconds or more.

A further setup configured to provide capacitor inrush current limitation may include a current limiting resistor coupled between a reference potential and one side of the reserve capacitor, wherein a switch, e.g. a NFET, may be coupled in parallel to the current limiting resistor. The current limiting resistor is bypassed with the NFET during normal operation of the airbag module, i.e. after the inrush current phase when the car is already running. In a yet further setup, a boost converter is arranged between the battery and the reserve capacitor. A current limiting resistor is arranged between the boost capacitor of the boost converter and the reserve capacitor, wherein a diode is coupled in parallel to the current limiting resistor in order to provide a reverse path in case the battery is lost and the whole infrastructure has to be provided with energy from the reserve capacitor. In this scenario, the boost capacitor and the reserve capacitor have to be provided as separate entities, adding to the space and cost requirement of the arrangement.

The wake switch functionality may be implemented by providing a wake switch, for example a PFET (p-channel FET) between the battery and the airbag module, wherein the wake switch may be turned on and off by means of a respective signal from the car's electronics, for example by means of a respective CAN (controller area network) signal. The PFET may be replaced by an NFET, which is roughly only half the size of a PFET, but requires a gate voltage lying above the source voltage such that a charge pump may have to be used. However, both setups are not provided with a soft start function.

In a further approach, the wake-switch functionality and the capacitor inrush current limitation functionality may be provided in one common integrated concept. This concept is based on an intelligent boost converter rectifier diode, which consists of a NFET based face to face configuration to eliminate the existing body diodes and to achieve an "ideal switch" like a relay. The two rectifier diodes provide isolation of the reserve capacitors from the battery in sleep mode (off-state) and further an inrush current limitation for power-on of the main operating module and rectifying functionality for the boost converter operation.

SUMMARY

In various embodiments a circuit is provided including an input terminal to receive an input voltage; a switch, a first controlled input of which being coupled to the input terminal; an inductor, a first terminal of which may be coupled in series to a second controlled input of the switch; a freewheeling diode, wherein a first diode terminal may be coupled with the second controlled input of the switch and with the first terminal of the inductor, and wherein a second diode terminal may be coupled with a reference potential; a capacitor coupled with a second terminal of the inductor; and a controller configured to operate the switch and the inductor in continuous current mode to charge the capacitor.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various embodiments of the invention are described with reference to the following drawings, in which.

DESCRIPTION

The following detailed description refers to the accompanying drawings that show, by way of illustration, specific details and embodiments in which the invention may be practiced.

The word "exemplary" is used herein to mean "serving as an example, instance, or illustration". Any embodiment or design described herein as "exemplary" is not necessarily to be construed as preferred or advantageous over other embodiments or designs.

The word "over" used with regards to a deposited material formed "over" a side or surface may be used herein to mean that the deposited material may be formed "directly on", e.g. in direct contact with, the implied side or surface. The word "over" used with regards to a deposited material formed "over" a side or surface, may be used herein to mean that the deposited material may be formed "indirectly on" the implied side or surface with one or more additional layers being arranged between the implied side or surface and the deposited material.

Figure 1:
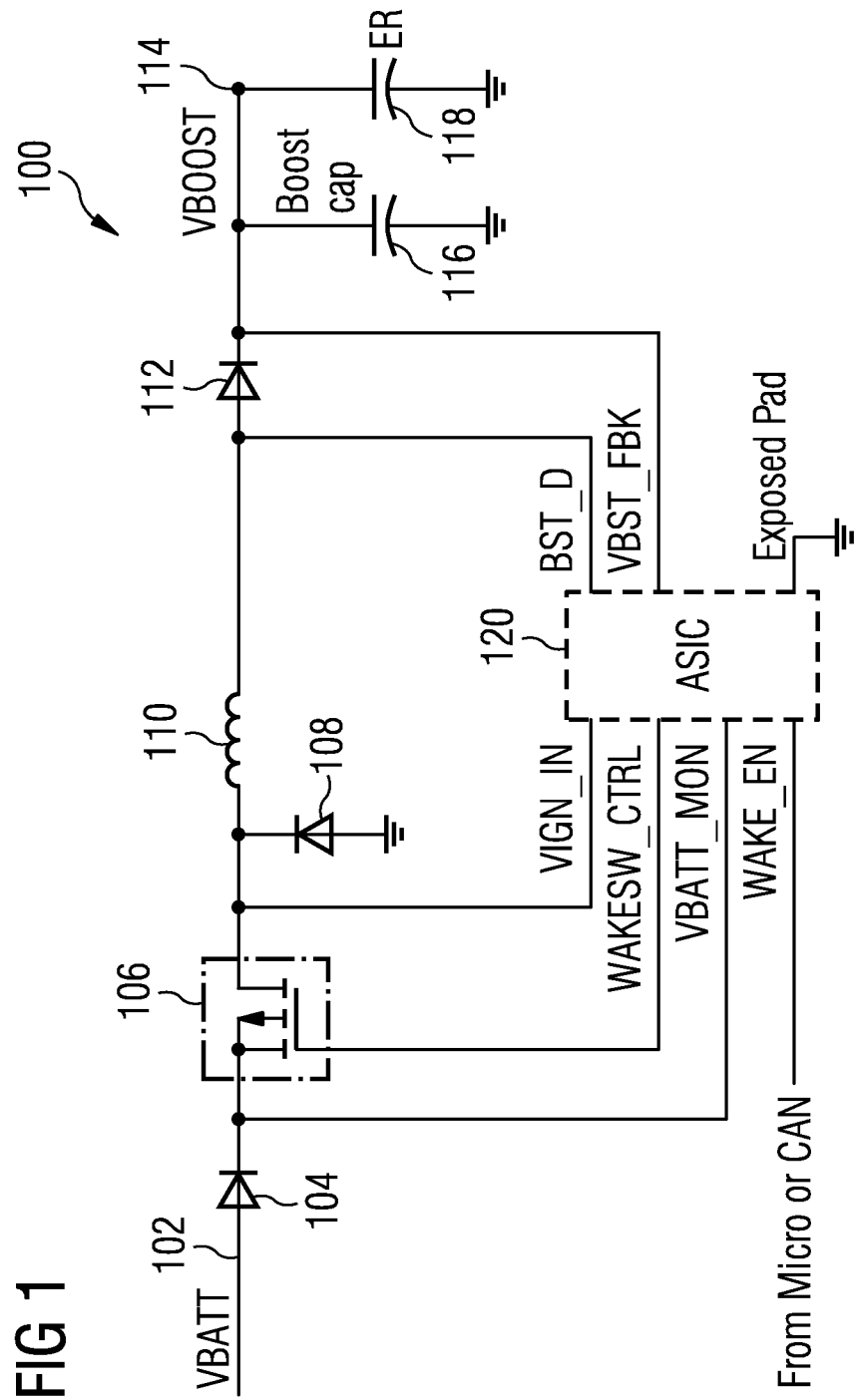
FIG. 1 shows an embodiment of the circuit according to various embodiments.

In FIG. 1 a circuit 100 according to various embodiments is shown. The circuit 100 according to various embodiments includes an input 102. The input 102 may be connected to a battery (not shown), for example to a battery of a vehicle such as a car. However, the input 102 may be coupled to any other suitable energy source which may act as a power supply and power the circuit 100. The input 102 of the circuit 100 according to various embodiments may be connected to a first controlled terminal of a switch 106 via a first diode 104. The first controlled terminal may be configured as a source/drain terminal and the switch 106 may be configured as a FET (field effect transistor), for example a PFET (p-channel FET). A second controlled terminal of the switch 106 may be coupled to a first side of an inductor 110. A second side of the inductor 110 may be coupled to an output 114 of the circuit 100 according to various embodiments via a second diode 112. One terminal of a third diode 108 may be coupled to the electrical path between the switch 106 and the inductor 110, the other terminal of the third diode 108 may be coupled to a reference potential, for example the ground potential. One side of a first capacitor 116 may be coupled to the electrical path between the second diode 112 and the output 114 of the circuit 100. The other side of the first capacitor 116 may be coupled to the reference potential. One side of a second capacitor 118 may be coupled to the electrical path between the second diode 112 and the output 114 of the circuit 100. The other side of the second capacitor 118 may be coupled to the reference potential. Therefore, the first capacitor 116 and the second capacitor 118 may be coupled in parallel. However, the first capacitor 116 and the second capacitor 118 may be provided as one capacitor with a capacitance which for example corresponds to the sum of the capacitance of the first capacitor 116 and the capacitance of the second capacitor 118. The circuit 100 according to various embodiments may further include a controller 120. The controller 120 may for example be configured as an ASIC (application specific integrated circuit) and it may include or be any kind of integrated circuit, for example a microchip, a RISC (reduced instruction set computer) microprocessor and/or a CISC (complex instruction set computer) microprocessor.

The controller 120 may have a first terminal VIGN_IN which may be coupled to the second controlled terminal of the switch 106. The first terminal VIGN_IN may be used to sense the voltage at the output of the first switch 106, i.e. at its second controlled terminal. The controller 120 may have a second terminal WAKESW_CTRL which may be coupled to the control terminal of the switch 106, for example to the gate terminal of the switch 106 configured as a PFET. The second terminal WAKESW_CTRL may be used to control the conductivity of the switch 106, i.e. to set the switch 106 into a more or less conductive state and to generally switch on and switch off the switch 106. The controller 120 may have a third terminal VBATT_MON which may be coupled to the electrical path between the first diode 104 and the switch 106. The third terminal VBATT_MON may be used by the controller 120 to monitor the input voltage, i.e. the voltage provided at the input 102 of the circuit 100 according to various embodiments which may be derived from a battery, for example. The controller 120 may have a fourth terminal WAKE_EN at which a signal may be provided to the controller 120, for example a signal form a microcontroller or a CAN (controller area network) signal. The signal provided at the fourth terminal WAKE_EN to the controller 120 may be used to wake up the controller 120, i.e. activate the controller 120 when it is inactive or in sleep mode. The controller 120 may have a fifth terminal which may include a pad which may be connected to the reference potential. The controller 120 may have a sixth terminal VBCK2_IN and a seventh terminal VBCK1_IN, both of which may be coupled to the electrical path between the second diode 112 and the output 114 of the circuit 100. The controller 120 may have an eighth terminal VBST_FBK which may be coupled to the electrical path between the second diode 112 and the output 114 of the circuit 100. The controller 120 may have a ninth terminal BST_D which may be coupled to the electrical path between the inductor 110 and the second diode 112.

The circuit 100 according to various embodiments may be configured to provide inrush current limiting functionality. The circuit 100 may offer the advantage of using components which may be already present in an airbag module in a car, such as the switch 106 which may fulfil the function of a wake switch and the inductor 110 which may fulfil the function of the boost inductor. Those two components just listed, the third diode 108 and the first capacitor 116 which may correspond to a boost capacitor, form a buck converter. The switch 106 may be used to power the system (the circuit 100 and components or circuits connected to its output), i.e. to establish low resistance path between the input 102 of the circuit 100 according to various embodiments and its output 114. The switch 106 may be for example closed (i.e. rendered conductive) to provide a low resistance path between the battery and the first capacitor 116 and the second capacitor 118. In the circuit 100 according to various embodiments the switch 106, which may be integrated with the other components of the circuit 100 or may be an external switch, may be also used for current limitation.

During the inrush current phase, i.e. during the phase in which the circuit 100 is enabled after being inactive and hence the first capacitor 116 and/or the second capacitor 118 are free of charges, the current flowing through the switch 106 is monitored. When the current during the inrush current phase reaches a predefined upper threshold, the switch 106 may be turned off (i.e. rendered non-conductive) by the controller 120 for a predefined period of time. This off-time may be a fixed period of time as it is the case in a PFM (pulse-frequency modulation) driving scheme or it may just as well be a variable period of time as it would be the case in a PWM (pulse-width modulation) driving scheme. During that time, the current will continue to flow through the third diode 108 which then fulfils the role of a freewheeling-diode into the first capacitor 116 and the second capacitor 118. Therefore, the cathode of the third diode 108 may be coupled between the second controlled terminal of the switch 106 and one side of the inductor 110, the anode of the third diode 108 may be coupled to the reference potential. After the current has decreased to a predefined lower threshold, the switch 106 is closed again such that the current may flow from the input 102 of the circuit 100 to its output 114. The upper threshold value of the inrush current may be defined by the maximum rated current the circuit 100 may withstand without getting degraded or damaged. By successive switching on and switching off of the switch 106, an average constant current may be provided to the first capacitor 116 and the second capacitor 118. The capacitors 116, 118 may be charged with a controlled constant (on average) inrush current. In other words, during the inrush current phase, the circuit 100 according to various embodiments behaves as a buck converter in current limitation, wherein the inrush current has a triangular shape which is typical of buck converters due to the inductive load switching. In the circuit 100 according to various embodiments as presented in FIG. 1 the first capacitor 116 may be a boost capacitance. The switch 106 functioning as a wake switch may be used as a current limiting component during the inrush current phase. The switch 106 may be operated in a switched manner during the inrush current phase to limit the maximum inrush current until the voltage across the first capacitance 116 and/or the second capacitance 118 is equal to the voltage at the input 102 of the circuit 100 according to various embodiments. The voltage applied to the input 102 of the circuit 100 may, for example, correspond to the voltage of a battery connected to the input 102 of the circuit 100. After the capacitors 116, 118 are charged (and hence the inrush current phase is over and the current flow through the switch 106 has reduced to the circuit's steady state current flow), the switch 106 may remain permanently switched on (i.e. in a state of low or almost no resistance). The voltage at the output 114 of the circuit 100 according to various embodiments may then correspond to approximately the voltage provided at the input 102 thereof, for example the voltage provided by a battery coupled to the input 102 reduced by the forward voltage drop of the first diode 104 and the second diode 112.

Since the switch 106 is operated in a switched manner during the inrush current phase, the power dissipation may be very low (as no power is dissipated in the switch 106 when no current is flowing therethrough). In other words, the energy dissipated by the switch 106 corresponding to the heat produced by the switch 106 may be very moderate. Therefore, the switch 106 may be integrated (for example provided on the same substrate or wafer as the rest of the components included in the circuit 100). Alternatively, the switch 106 may be provided separated from the controller 120, for example if the circuit 100 according to various embodiments is to handle very high inrush currents. The switch 106 acting as a wake switch may be used to ensure the flow of a controlled inrush current, such that a fast but well controlled inrush phase may be permitted during which the energy reserve capacitor may be charged fast. As noted above, the first capacitor 116 and the second capacitor 118 may be combined and thus provided as a single component which may result in reduced costs of the circuit 100 according to various embodiments and its more compact size.

The efficiency of the inrush current phase is determined by switching losses just as it would be the case in an ordinary buck converter. By operating the switch 106 in a switched manner during the inrush current phase, over-heating of the switch 106 which is known to take place in linear operating regulating pass-devices may be prevented. Thus, the switch 106 may be safely integrated with the rest of the circuit 100 according to various embodiments. Providing the switch 106 in an integrated fashion may simplify sensing of the current through the switch and also the sensing of its temperature to ensure that it does not overheat during the controlled inrush current phase. However, since the switch 106 may have to carry a significant current during the inrush current phase, it may be configured as a switch with a low on-state resistance $R_{DSON}$ and with a capability to conduct high currents. Therefore, the switch 106 may be provided in the form of an external discrete device.

As stated before, the switch 106 may be also be provided in the form of an external switch. In that case, however, the current sensing circuit may become more complicated. For example, the voltage across the inductor 110 may be sensed in order to further process the current.

In automotive applications (including functional safety tasks) where the wake switch, i.e. the switch 106, is provided, the supply line to the ignition key switch (contact 15 according to DIN 72552 standard for automobile electric terminal numbers) may be left out. The system may be initiated or started by the wake switch alone (which is connected to the permanent battery supply (contact 30 according to DIN 72552 standard for automobile electric terminal numbers)) when a corresponding signal is received by the controller 120, for example a CAN message specifying that the controller 120 is to power up and to activate the switch 106. This may further simplify the design of the inrush current limiting circuit which may be for example used in an airbag module.

Figure 2:
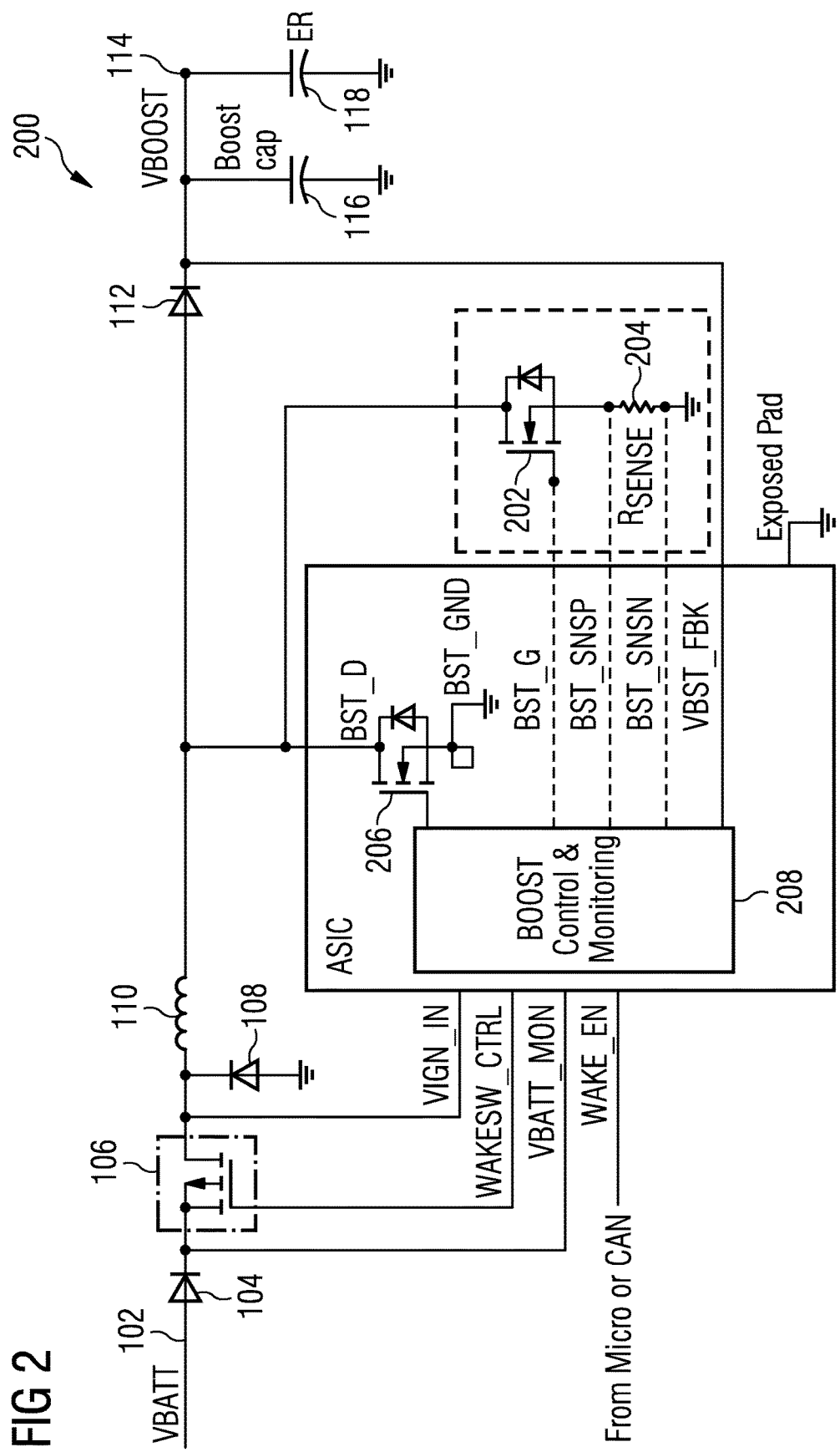
FIG. 2 shows a further embodiment of the circuit according to various embodiments.

In FIG. 2 a further implementation of the circuit according to various embodiments is shown. The circuit 200 shown in FIG. 2 may be used to provide an accurate current limitation in the case of the switch 106 being provided externally, i.e. not being integrated with the rest of the components of the circuit 200 according to various embodiments on the same substrate. In that case, an external sense resistor may be used or the wake switch (switch 106) needs to be integrated such that the sensing of the current flowing therethrough may be performed or a complex current sensing scheme based, for example, on integrating the inductor current may be employed. If no accurate current limitation is provided, the inductor 110 may need to be designed larger so that it does not saturate or overheat during the inrush current phase.

The circuit 200 according to various embodiments shown in FIG. 2 is based on the circuit 100 shown in FIG. 1. The same components shared by both circuits carry the same reference numbers and will not be described again in the context of the circuit 200 shown in FIG. 2. Only new components of the circuit 200 of FIG. 2 which are not present in the circuit 100 shown in FIG. 1 will be described.

The circuit 200 according to various embodiments may include a second switch 202 which may be configured as an NFET, for example, and may fulfil the function of a low-side switch of a boost converter. The first controlled terminal, for example a first source/drain terminal, of the second switch 202 may be coupled to the electrical path between the inductor 110 and the second diode 112, a second controlled terminal, for example the second source/drain terminal, of the second switch 202 may be coupled to the reference potential via a sense resistor 204. The controller 120 may further include a tenth terminal BST_SNSN which may be coupled to the side of the sense resistor 204 which is coupled to the reference potential, for example the ground potential. The controller 120 may further include an eleventh terminal BST_SNSP which may be coupled to the side of the sense resistor 204 which is coupled to the second switch 202. The controller 120 may further include a twelfth terminal BST_G which may be coupled to the control terminal, for example the gate terminal, of the second switch 202. The controller 120 may include an internal switch 206, which may be configured as an NFET. A first controlled terminal of the internal switch 206, for example a first source/drain terminal, may be coupled to the first controlled terminal of the second switch 202. A second controlled terminal of the internal switch 206, for example the second source/drain terminal, may be coupled to the reference potential, for example the ground potential. The control terminal of the internal switch 206, for example the gate terminal thereof, may be coupled to a boost control and monitoring circuit 208 included in the controller 120. Also, the tenth terminal BST_SNSN, the eleventh terminal BST_SNSP and the twelfth terminal BST_G which are provided in the controller 120 may be coupled to the boost control and monitoring circuit 208. The second switch 202 and the sense resistor 204 may be external components with respect to the controller 120 whereas the internal switch 206 may be provided within the controller 120. The switch 106, as in the previous exemplary embodiment of the circuit 100 shown in FIG. 1, may be integrated or it may be provided externally.

As in the embodiment of the circuit 100 according to various embodiments shown in FIG. 1, the embodiment shown in FIG. 2 makes use of already existing necessary components such as the switch 106, the inductor 110 and the second switch 202 as well as the current limitation scheme of the second switch 202 and its controller 120 to provide a fast and controlled charging of the capacitor(s) provided at the output 114 of the circuit 200.

During the inrush current phase, the second switch 202 may be switched on and switched off by the controller 120 synchronously with the switch 106 such that from a functional point of view a non-inverting buck-boost converter is formed. The second switch 202 may be seen to represent the boost switch. The internal switch 206 is equivalent to the second switch 202 in its function, however it is provided inside the controller 120. It may be seen as a redundant switch which may be used in case the second switch 202 is damaged or it may be used when the second switch 202 and the sense resistor 204 are not provided.

In the circuit 200 according to various embodiments it is possible to reuse the current limitation functionality of the boost converter included in the circuit 200 together with the controller 120 operating the boost converter. As the AC (alternate current) model of the circuit according to various embodiments is similar, it is possible to use the controller 120 during an operation mode, in which the converter included in the circuit 200 according to various embodiments is no longer a boost converter but a non-inverting buck-boost converter. As mentioned above, the non-inverting buck boost-converter may be realised by switching the switch 106 on and off synchronously with the second switch 202. When the switch 106 and the second switch 202 are switched on, a voltage equal to the difference between the potential at the input 102 of the circuit 200 and the reference potential is applied across the inductor 100 such that a current may flow therethrough and energy is stored in the inductor 110. When the switch 106 and the second switch 202 are switched off, the current flow from the input 102 of the circuit 200 through the inductor 110 is interrupted and instead the current will flow through the freewheeling diode 108 into the first capacitor 116 and the second capacitor 118, wherein the latter may for example represent the energy reserve capacitor.

The switch 106 and the second switch 202 in the circuit 200 according to various embodiments may be used in combination to implement a current limiting scheme. During the inrush current phase, the non-inverting buck-boost converter may start its operation using the controller 120 which may be referred to as the boost controller and which may control both switches, i.e. the switch 106 fulfilling the role of the wake switch and the second switch 202 fulfilling the role of the boost switch (or the internal switch 206 in case the second switch 202 is damaged or not provided at all). The current flowing through the second switch 202 may be sensed and monitored by the controller 120 by means of the sense resistor 204. The operation of the circuit 200 according to various embodiments during inrush current phase is equivalent to the operation of the circuit 100 according to various embodiments shown in FIG. 1, except that instead of only the switch 106 being turned on and off for predetermined periods of time the second switch 202 is turned on and off synchronously with the switch 106 to provide a fast and controlled inrush current phase. As in the previous exemplary embodiment of the circuit 100 shown in FIG. 1 the power dissipation in the switches is moderate and hence they do not heat up significantly. Therefore, both the switch 106 and the second switch 202 may be provided as integrated device within the circuit 200.

Figure 3:
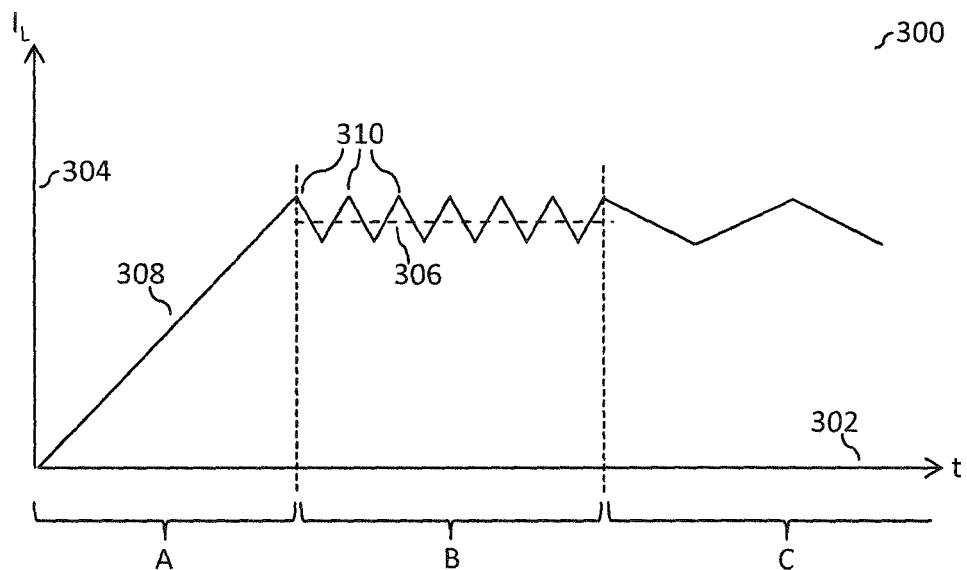
FIG. 3 shows a diagram explaining the operation of the circuit according to various embodiments.

During the inrush current phase the energy reserve capacitor, for example the second capacitor 118, is charged with a constant current (see FIG. 3, time period B in diagram 300). Once the voltage across the second capacitor 118 is equal to the voltage applied to the input 102 of the circuit 200, the inrush current phase is finished. This event, for example, may be detected by a comparator which may be provided within the controller 120. After the inrush current phase is finished, the switch 106 may remain switched on permanently and allow the converter to behave as a boost converter, wherein only the second switch 202 then fulfilling the role of the boost switch may be operated in a switched manner (see FIG. 3, time period C in diagram 300). Due to the switching of the second switch 202, the heat generated in the switch 106 due to energy dissipation may be reduced.

Also, the efficiency of the system is increased to the efficiency of a simple boost converter.

In diagram 300 in FIG. 3 the evolution of the current $I_L$ through the inductor 110 is shown. The x-axis 302 denotes time in arbitrary units, the y-axis 304 denotes current in arbitrary units.

The graph 308 representing the current $I_L$ through the inductor 110 is subdivided into three different phases. In a first phase A the current $I_L$ may be seen to decrease from zero to the upper threshold value. The beginning of the first phase A may represent the activation of an airbag module. During the first phase A, the switch 106 (and a further switch, be it the second switch 202 (external) or the internal switch 206, if present) remains switched on until the current $I_L$ reaches an upper threshold peak value 310. The current $I_L$ reaching the upper threshold peak value 310 for the first time initiates a second phase B during which the switch 106 is operated in a switched manner, i.e. switched on and off for predefined periods of time. During the second phase B, the circuit 100 according to various embodiments of FIG. 1 operates as a buck converter, whereas the circuit 100 according to various embodiments of FIG. 2 operates as a non-inverting buck-boost converter. However, the effect in both cases is equivalent. In both cases a controlled inrush current phase is provided, wherein the energy reserve capacitor (e.g. the second capacitor 118) may be charged with a controlled average inrush current resulting from the switched operation of the converter. In both cases, the converters may operate in continuous conduction mode, i.e. the controlled inrush current may flow continuously through the inductor throughout the switching period. The average current is indicated by the dashed line 306 in FIG. 3. During the charging process of the energy reserve capacitor, the voltage across that capacitor may be monitored by the controller 120. As soon as the voltage across the energy reserve capacitor is equal to the voltage provided at the input 102 of the circuit according to various embodiments, the inrush current phase is over. This event marks the end of the second phase B and a third phase C may be initiated which corresponds to the steady state operation of the circuit according to various embodiments. During that phase, the energy reserve capacitor 118 remains in its fully charged state and the switch 106 remains switched on permanently, whereas in the circuit 200 according to various embodiments shown in FIG. 2 the switch 106 remains switched on permanently and the second switch 202 fulfilling the role of a boost switch may be operated in a switched manner with a predefined duty cycle. In other words the circuit 200 according to various embodiments shown in FIG. 2 behaves as a boost converter after the controlled inrush current phase is finished.

Figure 4:
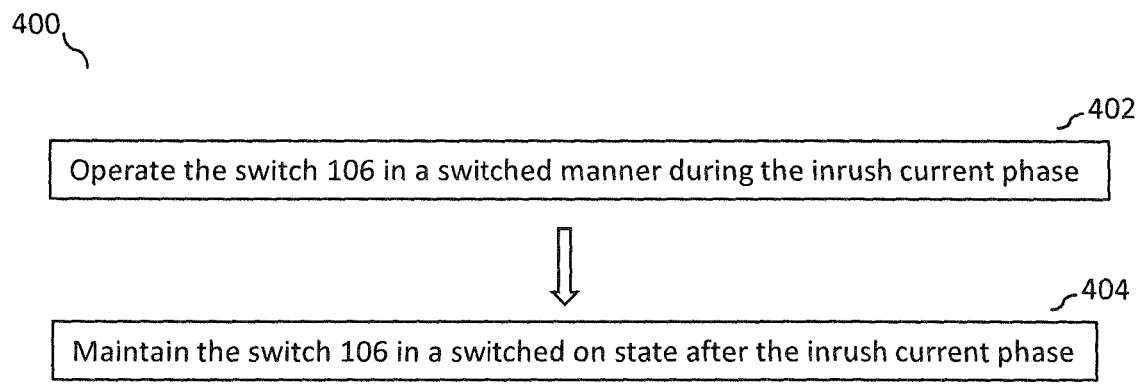
FIG. 4 shows a flow diagram explaining a method to operate the circuit according to various embodiments.

In FIG. 4 a flow diagram 400 explaining a method to operate the circuit according to various embodiments is shown.

In a first step 402, during the inrush current phase when the circuit according to various embodiments is started and at least the energy reserve capacitor is not charged, the switch 106 may be operated in a switched manner as to permit a fast and controlled inrush current phase. During that phase which may correspond to the first interval A and the second interval B in diagram 300 in FIG. 3, at least the energy reserve capacitor (e.g. the second capacitor 118) may be charged with a constant current provided by the converter included in the circuit according to various embodiments. That constant current (represented by the dashed line 306 in FIG. 3) corresponds to the average current output by the circuit which during this phase operates as a buck converter (in the case of the circuit 100 according to various embodiments shown in FIG. 1) or as a non-inverting buck-boost converter (in the case of the circuit 100 according to various embodiments shown in FIG. 1) in continuous current mode (CCM).

In a second step 404, once the inrush current phase is finished, the switch 106 remains in a switched on (i.e. conducting) state (corresponding to the third interval C in FIG. 3). The end of the inrush current phase may be seen to occur with the event of the voltage across at least the energy reserve capacitor being equal to the voltage provided at the input 102 of the circuit according to various embodiments. The monitoring of the two voltages may be performed by the controller 120. Once the controller detects the voltage across at least the energy reserve capacitor being equal to the voltage provided at the input 102 of the circuit according to various embodiments, it may discontinue driving the switch 106 in a switched manner. This may be the case for both exemplary embodiments of the circuit shown in FIG. 1 and FIG. 2. In the case of the circuit 200 according to various embodiments shown in FIG. 2, the circuit 200 may behave as a boost converter during the third interval C in diagram 300 of FIG. 3 which corresponds to a phase following the inrush current phase (represented by the first interval A and the second interval B in diagram 300).

The circuit according to various embodiments may be used as an inrush current limiter in automotive applications, for example in airbag modules. The energy reserve capacitor, which may correspond to the second capacitor 118, may have a capacitance in the range of a few tens of millifarad, for example 20 millifarad. The energy reserve capacitor may be provided in order to ensure proper operation of the airbag module in case the battery is lost and cannot supply energy to the airbag module. The electrical connection between the battery and the airbag module may be for example damaged during an accident. The energy reserve capacitor may have to supply currents in the range of 30 amperes when all squibs, i.e. the components within the air bag inflator that begin the deployment process of the airbag, are fired. In the circuit according to various embodiments the energy reserve capacitor (for example the second capacitor 118) and the boost capacitor (for example the first capacitor 116) may be combined such that only one capacitance device needs to be provided.

In general, the start up (i.e. the activation) of an airbag system in a vehicle may last on the order of a few seconds, for example it may last between 4 and 6 seconds. The circuit according to various embodiments may be used in the airbag module to provide maximum controlled inrush current to permit a fast and simultaneously well controlled inrush current phase such that the energy reserve capacitor may be charged as fast as possible, but in a controlled manner. The maximum controlled inrush current during that phase may correspond to the maximally achievable current from the operation of the circuit according to various embodiments as a buck converter or as a non-inverting buck-boost converter, depending on the actual implementation of the circuit. Since the wake switch (i.e. the switch 106) and the boost switch (i.e. the switch 202 as an external boost switch or its internal version in the form of the internal switch 206) may be operated in a controlled switched manner (i.e. they may be turned on and off for predetermined times) instead of being linear regulators, the heat dissipation may be reduced. Therefore, both switching devices may be integrated.

The frequency at which at least one of the switches is switched during the controlled inrush current phase may be chosen to correspond to the frequency of a pi-filter which is commonly used in automotive applications and may be provided to ensure that noise from the airbag module cannot spread onto the power rails connected with the battery of the vehicle and other electronic components thereof. The maximum damping frequency of pi-filters used in automotive applications is in the range of 300 kHz. Therefore, the switch 106 and the second switch 202 (if present in the embodiment) may be switched at the same rate by using an appropriately configured PWM scheme such that the noise produced by the switching scheme may be effectively filtered out by the pi-filter. However, the switching devices may be chosen to be switched at lower or higher frequencies as well, for example at 600 kHz, which may enable the circuit according to various embodiments to provide a higher average current. The pi-filter may be for example coupled between the energy source such as a battery and the input 102 of the circuit according to various embodiments. The pi-filter has been only mentioned by way of example due to its prevalent use in automotive applications and may be of course replaced by any other filter topology providing the desired filtering bandwidth.

The switch 106 may be further used as a safety switch. In the case of a hard shortcut which may be for example present inside the internal switch 206 or inside the second switch 202, the switch 106 may be rendered non-conducting and hence prevent the shorting of the power source, for example a vehicle battery, to the reference potential. In other words, the circuit according to various embodiments may have inherent functional safety by virtue of the switch 106.

The circuit according to various embodiments may be further configured to maintain the voltage applied to the at least one capacitor (i.e. the energy reserve capacitor and/or the boost capacitor) in case the voltage applied to the input 102 of the circuit according to various embodiments exceeds its nominal value. This may be performed by operating the circuit according to various embodiments in the same manner as during the controlled inrush current phase, only that in this case the control scheme may be voltage based and not current based. In other words, the controller 120 may be configured to monitor the voltage applied to at least one of the capacitors and switch on the switch 106 and the second switch 202 (if present) such that the voltage applied to the at least one capacitor maintains its steady state value. In this way, the capacitors may be protected from being "stressed" by a too high voltage. In automotive applications, the battery is usually configured to provide a voltage of maximum 40V.

Figure 5:
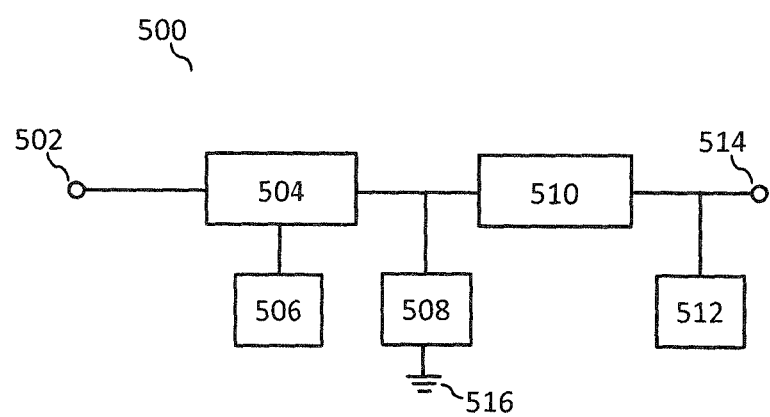
FIG. 5 shows the circuit according to various embodiments.

In FIG. 5, an implementation of the circuit according to various embodiments is shown. The circuit 500 according to various embodiments may include an input terminal 502 to receive an input voltage, a switch 504, a first controlled input of which may be coupled to the input terminal 502, an inductor 510, a first terminal of which may be coupled in series to a second controlled input of the switch 504, a freewheeling diode 508, wherein a first diode terminal may be coupled with the second controlled input of the switch 504 and with the first terminal of the inductor 510, and wherein a second diode terminal may be coupled with a reference potential 516, a capacitor 512 coupled with a second terminal of the inductor 510, and a controller 506 configured to operate the switch 504 and the inductor 510 in continuous current mode to charge the capacitor 512. The circuit 500 according to various embodiments may further include an output terminal 514 to provide an output voltage.

In accordance with various embodiments, a circuit is provided which may include an input terminal to receive an input voltage, a switch, a first controlled input of which being coupled to the input terminal, an inductor, a first terminal of which is coupled in series to a second controlled input of the switch, a freewheeling diode, wherein a first diode terminal may be coupled with the second controlled input of the switch and with the first terminal of the inductor, and wherein a second diode terminal may be coupled with a reference potential, a capacitor coupled with a second terminal of the inductor, and a controller configured to operate the switch and the inductor in continuous current mode to charge the capacitor.

In accordance with various further embodiments, the circuit may include a battery, wherein the input terminal may coupled to an output of the battery.

In accordance with various further embodiments of the circuit, the controller may be configured to switch on the switch when the operation of the circuit is to be initiated.

In accordance with various further embodiments of the circuit, the controller may be configured to switch off the switch when the current through the switch has reached a predetermined upper threshold value.

In accordance with various further embodiments of the circuit, the controller may be configured to switch on the switch when the current through the switch has fallen to a predetermined lower threshold value from a predetermined upper threshold value.

In accordance with various further embodiments of the circuit, the predetermined lower threshold value may be smaller than the predetermined upper threshold value.

In accordance with various further embodiments, the circuit may further include a voltage sensing circuit configured to determine the voltage across the capacitor.

In accordance with various further embodiments of the circuit, the voltage sensing circuit may be coupled to the controller.

In accordance with various further embodiments of the circuit, the voltage sensing circuit may be an integral part of the controller.

In accordance with various further embodiments of the circuit, the controller may be configured to switch on the switch permanently when the voltage across the capacitor is substantially equal to the input voltage.

In accordance with various further embodiments of the circuit, as long as the voltage across the capacitor is smaller than the input voltage, the circuit may be configured to operate as a buck converter.

In accordance with various further embodiments, the circuit may further include at least one second capacitor which may be coupled in parallel to the capacitor. The at least one second capacitor may be configured as a tank capacitor.

In accordance with various further embodiments of the circuit, the capacitance of the capacitor may be larger than 1 Millifarad.

In accordance with various further embodiments of the circuit, the capacitance of the capacitor may be larger than the capacitance of the second capacitor.

In accordance with various further embodiments, the circuit may further include an input filter coupled to the input terminal.

In accordance with various further embodiments of the circuit, the filter may be configured as a pi filter.

In accordance with various further embodiments of the circuit, the controller may be configured to switch on and switch off the switch at a frequency lying in the passband of the filter when the capacitor is to be charged.

In accordance with various further embodiments of the circuit, the controller may be configured to switch on and switch off the switch at a frequency lying in the stopband of the filter when the capacitor is to be charged.

In accordance with various embodiments the state of the capacitor in which it is to be charged may correspond to a state in which the voltage across the capacitor is smaller than the input voltage.

In accordance with various further embodiments of the circuit, the switch may include a power switch.

In accordance with various further embodiments of the circuit, the switch may be configured as a FET.

In accordance with various further embodiments of the circuit, the switch may be configured as an NFET.

In accordance with various further embodiments of the circuit, the switch may be configured as a PFET.

In accordance with various further embodiments of the circuit, the switch may be configured as a current limiting element during the charging of the capacitor.

According to various embodiments, a circuit is provided which may include an input terminal to receive an input voltage, a first switch, a first controlled terminal of which being coupled to the input terminal, an inductor, a first terminal of which may be coupled in series to a second controlled terminal of the second switch, a freewheeling diode, wherein a first diode terminal may be coupled with the second controlled terminal of the first switch and with the first terminal of the inductor, and wherein a second diode terminal may be coupled with a reference potential, a capacitor coupled with a second terminal of the inductor, a second switch, a first controlled terminal of which may be coupled to a second terminal of the inductor and a second controlled terminal of which may be coupled to a reference potential, and a controller configured to operate the first switch, the second switch and the inductor in continuous current mode to charge the capacitor.

In accordance with various further embodiments, the circuit may further include a battery, wherein the input terminal may be coupled to an output of the battery.

In accordance with various further embodiments of the circuit the controller may be configured to switch on the first switch synchronously with the second switch when the operation of the circuit is to be initiated.

In accordance with various further embodiments of the circuit, the controller may be configured to switch off the first switch synchronously with the second switch when the current through the any one of the switches has reached a predetermined upper threshold value.

In accordance with various further embodiments of the circuit the controller may be configured to switch on the first switch synchronously with the second switch when the current through any of the switches has fallen to a predetermined lower threshold value from a predetermined upper threshold value.

In accordance with various further embodiments, the circuit may further include a sense resistor coupled between the second controlled terminal of the second switch and the reference potential.

In accordance with various further embodiments of the circuit the controller may be configured to determine the current flowing through any of the switches by determining the current flowing through the sense resistor.

In accordance with various further embodiments of the circuit, the predetermined lower threshold value is smaller than the predetermined upper threshold value.

In accordance with various further embodiments, the circuit may further include a voltage sensing circuit configured to determine the voltage across the capacitor.

In accordance with various further embodiments of the circuit the voltage sensing circuit may be coupled to the controller.

In accordance with various further embodiments of the circuit the voltage sensing circuit may be an integral part of the controller.

In accordance with various further embodiments of the circuit the controller may be configured to switch on the first switch permanently when the voltage across the capacitor is substantially equal to the input voltage.

In accordance with various further embodiments of the circuit the controller may be configured to operate the second switch and the inductor in continuous current mode as a boost converter when the voltage across the capacitor is substantially equal to the input voltage.

In accordance with various further embodiments of the circuit as long as the voltage across the capacitor is smaller than the input voltage, the circuit may be configured to operate as a non-inverting buck-boost converter.

In accordance with various further embodiments the circuit may further include a second capacitor which may be coupled in parallel to the capacitor.

In accordance with various further embodiments of the circuit the capacitance of the capacitor may be larger than 1 Millifarad.

In accordance with various further embodiments of the circuit the capacitance of the capacitor may be larger than the capacitance of the second capacitor at least by a factor of 3.

In accordance with various further embodiments, the circuit may further include an input filter coupled to the input terminal.

In accordance with various further embodiments of the circuit the filter may be configured as a pi filter.

In accordance with various further embodiments of the circuit the controller may be configured to switch on and switch off the first switch synchronously with the second switch at a frequency lying in the passband of the filter when the capacitor is to be charged.

In accordance with various further embodiments of the circuit the controller may be configured to switch on and switch off the switch synchronously with the second switch at a frequency lying in the stopband of the filter when the capacitor is to be charged.

In accordance with various further embodiments of the circuit the first switch and/or the second switch may include a power switch.

In accordance with various further embodiments of the circuit the first switch and/or the second switch may be configured as a FET.

In accordance with various further embodiments of the circuit the first switch and/or the second switch may be configured as an NFET.

In accordance with various further embodiments of the circuit the first switch and/or the second switch may be configured as a PFET.

In accordance with various further embodiments of the circuit the first switch and/or the second switch may be configured as a current limiting element during the charging of the capacitor.

In accordance with various further embodiments of the circuit the first switch and/or the second switch may be integrated in a common substrate.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

What is claimed is:

1. A circuit, comprising:
   a switch configured to receive an electrical input;
   an inductor, coupled in series between an output of the switch and at least a capacitor;
   a freewheeling diode coupled between a reference potential and an input of the inductor;
   a controller configured to switch on and off the switch during an inrush current phase so that during the inrush current phase an electrical current flows continuously through the inductor to at least charge the capacitor; wherein the controller comprises a terminal directly coupled to an output of the switch; and
   an additional terminal coupled to the electrical path between a power supply input of the circuit and an input of the switch.

2. The circuit of claim 1,
   wherein the controller is configured to switch on the switch when the operation of the circuit is to be initiated.

3. The circuit of claim 1,
   wherein the controller is configured to switch off the switch when the current through the switch has reached a predetermined upper threshold value.

4. The circuit of claim 1,
   wherein the controller is configured to switch on the switch when the current through the switch has fallen to a predetermined lower threshold value from a predetermined upper threshold value.

5. The circuit of claim 1, further including:
   a voltage sensing circuit configured to determine the voltage across the capacitor.

6. The circuit of claim 5,
   wherein the controller is configured to switch on the switch permanently when the voltage across the capacitor is substantially equal to a voltage of the electrical input.

7. The circuit of claim 5,
   wherein as long as the voltage across the capacitor is smaller than a voltage of the electrical input, the circuit is configured to operate as a buck converter.

8. The circuit of claim 1, further including:
   an input filter coupled to an input of the switch.

9. Circuit of claim 8,
   wherein the controller is configured to switch on and switch off the switch at a frequency lying in the passband of the filter when the capacitor is to be charged.

10. Circuit of claim 8,
    wherein the controller is configured to switch on and switch off the switch at a frequency lying in the stopband of the filter when the capacitor is to be charged.

11. The circuit of claim 1, further comprising a second switch having a first controlled terminal coupled to the electrical path between the inductor and the second diode.

12. A method for operating a circuit, comprising:
    receiving, an electrical input at a switch, wherein an inductor is coupled in series between an output of the switch and at least a capacitor and wherein a freewheeling diode is coupled between a reference potential and an input of the inductor; and
    switching, by a controller, the switch on an and off during an inrush current phase so that an electrical current flows continuously through the inductor to at least charge the capacitor; wherein the controller comprises a terminal directly coupled to an output of the switch; and wherein the controller comprises an additional terminal coupled to the electrical path between a power supply input of the circuit and an input of the switch.

13. A circuit, comprising:
    a first switch configured to receive an electrical input;
    an inductor, coupled in series between an output of the switch and at least a capacitor;
    a freewheeling diode coupled between a first reference potential and an input of the inductor;
    a second switch coupled between an output of the inductor and the reference potential;
    a controller configured to switch on and off the first switch and the second switch during an inrush current phase so that during the inrush current phase an electrical current flows continuously through the inductor to at least charge the capacitor;
    wherein the controller comprises a terminal directly coupled to an output of the first switch; and
    an additional terminal coupled to the electrical path between a power supply input of the circuit and an input of the switch.

14. Circuit of claim 13,
    wherein the controller is configured to switch on the first switch synchronously with the second switch when the operation of the circuit is to be initiated.

15. Circuit of claim 13,
    wherein the controller is configured to switch off the first switch in sync with the second switch when the current through the any one of the switches has reached a predetermined upper threshold value.

16. Circuit of claim 15,
    wherein the controller is configured to switch on the first switch in sync with the second switch when the current through any of the switches has fallen to a predetermined lower threshold value from the predetermined upper threshold value.

17. Circuit of claim 13,
    wherein the circuit further comprises a sense resistor coupled between the second controlled terminal of the second switch and the reference potential.

18. Circuit of claim 17,
    wherein the controller is configured to determine the current flowing through any of the switches by determining the current flowing through the sense resistor.

19. Circuit of claim 13,
    wherein as long as the voltage across the capacitor is smaller than a voltage of the electrical input, the circuit is configured to operate as a non-inverting buck-boost converter.

20. A method for operating a circuit, comprising:
    receiving, an electrical input at a first switch, wherein an inductor is coupled in series between an output of the switch and at least a capacitor and wherein a freewheeling diode is coupled between a reference potential and an input of the inductor; and
    switching, by a controller, the first switch and a second switch on and off during an inrush current phase so that an electrical current flows continuously through the inductor to charge at least the capacitor, wherein the second switch is coupled between an output of the inductor and the reference potential; wherein the controller comprises a terminal directly coupled to an output of the first switch;

and wherein the controller comprises an additional terminal coupled to the electrical path between a power supply input of the circuit and an input of the switch.

* * * * *